United States Patent Office 2,781,330
Patented Feb. 12, 1957

2,781,330

RUBBER CONTAINING UREA COMPOUND AS AN ANTI-EXPOSURE CRACKING AGENT

Paul M. Downey, Nitro, W. Va., assignor to Monsanto Chemical Company, St. Louis, Mo., a corporation of Delaware No Drawing. Application February 9, 1953,
Serial No. 335,989

9 Claims. (Cl. 260—45.9)

This invention relates to new anti-exposure cracking agents for sulfur-vulcanizable rubbers and to rubber vulcanizates containing same.

One of the major problems of the rubber industry is the protection of vulcanizates of sulfur-vulcanizable rubbers against exposure cracking, that is degradation of the vulcanizate due to ozone while under static or dynamic stress. The problem is a serious one, particularly with respect to the service life of rubber tires, and is aggravated by the fact that in general chemical antioxidants have little or no value in protecting vulcanizates against deterioration by ozone. Although many and varied substances have been suggested and tried, not one has been found entirely satisfactory. Accordingly rubber technologists have constantly sought improvements.

In accordance with this invention it has been found that unsymmetrical disubstituted urea compounds in which the substituents are on different nitrogen atoms are highly effective anti-exposure cracking agents for sulfur-vulcanizable rubber vulcanizates. The class of compounds found to be effective have a different organic substituent attached to each nitrogen atom of the nucleus

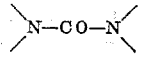

Preferably the radicals are of a different class such as an aliphatic and an aryl group. The aliphatic radicals include both open and closed chain radicals. For example 2-ethyl carbanilide affords only slight protection whereas 1-cyclohexyl-3-p-tolylurea is highly effective. In general, dihydrocarbon substituted ureas of the class 1-phenyl-3-substituted phenylureas exhibited a low order of activity. However, diaryl substituted ureas in which one substituent is selected from the benzene series and the other from the napthalene series are highly effective. By benzene series is meant radicals which contain a six carbon nucleus and by naphthalene series radicals which contain a ten carbon nucleus.

The new family of anti-exposure cracking agents possess the general formula

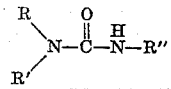

where R represents hydrogen or with R' constitutes a cycloalkylene group; R' when independent of R represents a hydrocarbon group and R" represents a hydrocarbon group different from the substituent on the other nitrogen.

Examples of suitable anti-exposure cracking agents of this invention are
4-morpholine carboxanilide
1-cyclohexyl-3-phenylurea
1-cyclohexyl-3-(1-naphthyl)urea
4-ethylcarbanilide
1-(2-naphthyl)-3-phenylurea
1-(1-naphthyl)-3-phenylurea
1-cyclohexyl-3-p-tolylurea 1-cyclohexyl-3-o-tolylurea
1-cyclohexyl-3-m-tolylurea
1-cyclohexyl-3-p-tert-butylphenylurea
1-indenyl-3-phenylurea
1-methylcyclohexyl-3-p-tolylurea
1-dimethylcyclohexyl-3-p-tolylurea
1-hexyl-3-p-tolylurea
1-butyl-3-p-tolylurea
1-phenyl-3-p-tolylurea
1-(p-ethylphenyl)-3-phenylurea
1-(p-tert-butylphenyl)-3-phenylurea
1-(p-sec-amylphenyl)-3-phenylurea
1-phenyl-3-p-xenylurea
1-(p-tert-butylphenyl)-3-(1-naphthyl)urea As illustrative of the anti-exposure cracking properties of the urea compounds of this invention natural rubber compositions are prepared utilizing the following ingredients:

| Stock | A | B |
|---|---|---|
| | Parts by weight | Parts by weight |
| Smoked sheets rubber | 100 | 100 |
| Carbon black | 50 | 50 |
| Saturated hydrocarbon softener | 3 | 3 |
| Zinc oxide | 5 | 5 |
| Stearic acid | 3 | 3 |
| Sulfur | 2.5 | 2.5 |
| N-cyclohexyl-2-benzothiazole sulfenamide | 0.8 | 0.8 |
| Anti-exposure cracking agent | | 1.5 |

The ingredients are admixed on a rubber mill in the customary fashion and the respective compounded stocks are cured in a press at 142° C. for 30 minutes. Since evaluation under static conditions is not indicative of the service obtained with many types of rubber articles which must withstand flexing, the vulcanized compositions are evaluated under dynamic conditions in an atmosphere containing a definite concentration of ozone. Samples of the stocks are cured in the form of a belt ½" wide, ¼" thick and 5 5/16" diameter and mounted on 1" diameter shafts. The ozone concentration is maintained at 20–30 parts per hundred million throughout the test and the shafts are rotated at 75 R. P. M. In this manner a momentary elongation through a range of 0–20% is provided at any portion of the test specimen passing over the shaft. (The apparatus and procedure employed is described in a paper of Creed et al. entitled "An Apparatus for the Evaluation of Ozone Protective Agents for Elastomers Under Dynamic Conditions" given at the Cincinnati, Ohio, Meeting of the Rubber Division of the American Chemical Society, May 1, 1952.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table I

| Anti-exposure cracking agent | Stock | Surface cracking after flexing in ozone for— | | | |
|---|---|---|---|---|---|
| | | 8 hrs. | 24 hrs. | 48 hrs. | 56 hrs. |
| None | A | None | Slight | Moderate | Severe |
| 1-(2-naphthyl)-3-phenylurea | B | do | None | Slight | Moderate |

The new compounds of this invention are particularly useful in the control of exposure cracking of the sulfur-vulcanizable synthetic rubber-like materials prepared by the polymerization of a conjugated diene compound, either alone or with other unsaturated compounds copolymerizable therewith. The synthetic rubbers which may be substantially improved in ozone resistance are polymers of the aliphatic conjugated diene compounds such as butadiene, isoprene, piperylene, dimethyl butadiene, ethyl butadiene, and the like either alone or with unsaturated mono-olefinic compounds which contain the $CH_2=C<$ group such as the vinyl aromatics, namely styrene, α-methyl styrene, nuclear substituted styrenes, monochlorstyrene, dichlorstyrene, divinyl benzene, vinyl naphthalene, vinyl biphenyl, vinyl carbazole, 2-vinyl-5-ethyl pyridine, etc., and such vinyl compounds as acrylonitrile, methacrylonitrile, acrylic acid, methacrylic acid and esters thereof, methyl vinyl ketone, and the like.

As illustrative of the control of exposure cracking of vulcanized sulfur-vulcanizable synthetic rubber-like materials, rubbery butadiene-1,3-styrene copolymer compositions are prepared utilizing the following ingredients:

| Stock | C | D |
|---|---|---|
| | Parts by weight | Parts by weight |
| GR-S 100 | 100 | 100 |
| Carbon black | 50 | 50 |
| Saturated hydrocarbon softener | 10 | 10 |
| Zinc oxide | 4 | 4 |
| Stearic acid | 2 | 2 |
| Sulfur | 1.75 | 1.75 |
| N-cyclohexyl-2-benzothiazole sulfenamide | 1.2 | 1.2 |
| Anti-exposure cracking agent | | 1.5 |

The ingredients are admixed on a rubber mill in the customary fashion and the respective compounded stocks are cured in a press at 144° C. for 30 minutes. The vulcanizates are then evaluated for cracking resistance as aforedescribed. In Table II the ratio of the cracking resistance of stock D to that of an untreated control (stock C) is recorded. This is a very convenient method of summarizing the data. The data were obtained by assigning a numerical rating as a measure of the degree of cracking and plotting these units on the vertical axis against the time of exposure. The numbers employed and the corresponding descriptions were as follows:

1. No cracking
2. Very slight cracking
3. Slight cracking
4. Moderate cracking
5. Severe cracking
6. Very severe cracking A set of stocks answering this description was used as a standard and each stock was compared to this standard so as to assign a comparable numerical rating. The six degrees of cracking were designated on the vertical axis in reverse order, in other words beginning with six nearest the horizontal axis and ending with one at the top. Plotting the numerical ratings against exposure time in this manner gave a curve which approached the horizontal axis as the cracking progressed. Obviously, the greater the area under the curve the greater the degree of protection. Observations were made at intervals usually after 8, 24, 48, 72 and 96 hours. The areas under the curve were then measured with a planimeter and the area divided by the area for a similar stock run at the same time without any anti-flex cracking agent. The resulting figure is the ratio of the protection as compared to the untreated stock as 100. This value is designated as protection ratio.

*Table II*

Anti-exposure cracking agent: Protection ratio
1-cyclohexyl-3-phenylurea _____ 128
1-cyclohexyl-3-(1-naphthyl)urea _____ 156
1-(2-Naphthyl)-3-phenylurea _____ 251
1-cyclohexyl-3-p-tolylurea _____ 260
1-cyclohexyl-3-o-tolylurea _____ 142
4-phenylcarbanilide _____ 126
2-methyl-1-piperidinecarboxanilide _____ 132
4-morpholinecarboxanilide _____ 136

As further illustrative of rubber-like compositions exhibiting improved resistance to exposure cracking are sulfur-vulcanizable stocks comprising such synthetic rubbers as the rubbery copolymers of butadiene-1,3 and acrylonitrile (e. g. Hycar OR-15), and the rubber-like polymers of isobutylene with small amounts of diolefins such as isoprene (e. g. butyl rubber), specific examples being

| Stock | E | F |
|---|---|---|
| | Parts by weight | Parts by weight |
| Butadiene-acrylonitrile rubber | 100 | |
| Isobutylene-isoprene rubber | | 100 |
| Carbon black | 60 | 54 |
| Zinc oxide | 4 | 4 |
| Stearic acid | 1 | 1 |
| Sulfur | 1.5 | 0.75 |
| 2-2'-dithiobis benzothiazole | 1.5 | 1.0 |
| Tetra ethyl thiuram disulfide | | 1.5 |
| Lead oxide | | 5.0 |
| 1-(2-naphthyl)-3-phenylurea | 2.0 | 2.0 |

It is obvious from the foregoing that the urea compounds of this invention are a class of compounds which substantially increase the life of natural and synthetic rubber goods. The new anti-exposure cracking agents disperse readily and rapidly in rubber stocks, both natural and synthetic.

An important advantage of the anti-exposure cracking agents of this invention is that they do not stain nor discolor the rubber stocks into which they are incorporated. To illustrate this property rubber stocks are compounded comprising

| Stock | G | H |
|---|---|---|
| | Parts by weight | Parts by weight |
| Pale crepe rubber | 100 | 100 |
| Zinc oxide | 60 | 60 |
| Lithopone | 20 | 20 |
| Sulfur | 2 | 2 |
| Diphenylguanidine phthalate | 0.825 | 0.825 |
| 2-benzothiazyl thiol benzoate | 0.675 | 0.675 |
| Paraffin | 0.25 | 0.25 |
| Anti-exposure cracking agent | | 1.5 |

The stocks are vulcanized by heating 60 minutes in a press and samples of the cured stocks exposed under an S-1 sunlamp for various intervals. The light reflected from the surface of the stocks is measured by means of a photovolt reflectance meter calibrated against reflectance of standard MgO as 100%. On untreated control (stock G) is run at the same time. Comparing stock H to the untreated control shows whether or not the anti-exposure cracking agent causes discoloration.

*Table III*

| Anti-exposure cracking agent | Stock | Temp. of cure, °C. | Light reflectance, percent | | |
|---|---|---|---|---|---|
| | | | Unexposed | After exposure to sunlamp | |
| | | | | 24 Hrs. | 10 Days |
| None | G | 126 | 76 | 76 | 76 |
| 1-cyclohexyl-3-(1-naphthyl) urea | H | 126 | 74 | 71 | 66 |
| None | G | 126 | 75 | 75 | 69 |
| 1-(2-naphthyl)-3-phenylurea | H | 126 | 72 | 72 | 64 |
| None | G | 142 | 81 | 79 | 74 |
| 1-cyclohexyl-3-p-tolylurea | H | 142 | 78 | 76 | 72 |
| None | G | 142 | 81 | 79 | 74 |
| 1-cyclohexyl-3-o-tolylurea | H | 142 | 78 | 78 | 72 |
| None | G | 126 | 75 | 75 | 69 |
| 4-morpholine-carboxanilide | H | 126 | 72 | 72 | 71 |

Smaller amounts of the urea compounds of this invention may be employed than those indicated in the foregoing examples. Amounts as small as 0.2% by weight on the rubber (natural and synthetic) of the urea compounds of this invention exhibit satisfactory anti-exposure cracking properties. Amounts higher than those specifically shown, as for example up to 5% by weight on the rubber, may be employed depending upon the nature of the urea compound as well as that of the rubber, the other compounding ingredients used and the objectives of the compounder.

By the terms "vulcanized rubber" and "sulfur-vulcanizable rubber" as employed in the appended claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the anti-exposure cracking agent. For example, there may be incorporated other accelerators, softeners, etc. as well as the customary rubber antioxidants.

While the invention has been described with respect to certain specific embodiments it is not so limited and it is to be understood the variations and modifications thereof obvious to those skilled in the art may be made without departing from the spirit or scope of this invention.

What is claimed is:

1. A sulfur-vulcanizable rubber vulcanizate containing a urea compound of the formula

where R and R' are unlike hydrocarbon radicals at least one of the substituents being an aromatic group.

2. A vulcanized natural rubber composition containing a urea compound of the formula

where R represents a cyclohexyl group and R' represents an aromatic hydrocarbon radical.

3. A vulcanized rubber composition containing a urea compound of the formula R—NH—CO.—NH—R' where R and R' are unlike hydrocarbon radicals at least one being aromatic, said rubber being a sulfur-vulcanizable synthetic rubber-like polymer prepared by the polymerization of an aliphatic conjugated diene compound.

4. A vulcanized rubber composition containing a urea compound of the formula R—NH—CO.—NH—R' where R and R' are unlike aromatic hydrocarbon radicals, one a member of the benzene series and the other a member of the naphthalene series, said rubber being a sulfur-vulcanizable synthetic rubber-like polymer prepared by the polymerization of an aliphatic conjugated diene compound and an unsaturated mono-olefinic compound which contains the $CH_2=C<$ group and is copolymerizable therewith.

5. A vulcanized rubber composition containing a urea compound of the formula

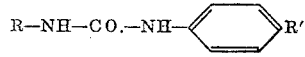

where R is a cyclohexyl radical and R' is an alkyl radical of less than six carbon atoms, said rubber being a sulfur-vulcanizable copolymer of a butadiene-1,3 hydrocarbon and a vinyl aromatic monomer copolymerizable therewith.

6. A vulcanized rubber composition containing 1-(2-naphthyl)-3-phenylurea, said rubber being a butadiene-styrene copolymer.

7. A vulcanized rubber composition containing 1-cyclohexyl-3-p-tolylurea, said rubber being a butadiene-styrene copolymer.

8. A vulcanized rubber composition containing 1-cyclohexyl-3-(1-naphthyl)urea, said rubber being a butadiene-styrene copolymer.

9. A vulcanized rubber composition containing a urea compound of the formula R—NH—CO.—NH—R' where R is an aliphatic hydrocarbon radical containing no more than eight carbon atoms and R' is an aromatic hydrocarbon radical containing no more than ten carbon atoms, said rubber being a sulfur-vulcanizable copolymer of a butadiene-1,3 hydrocarbon and a vinyl aromatic monomer copolymerizable therewith.

References Cited in the file of this patent

UNITED STATES PATENTS 2,651,623    Hill et al. _____ Sept. 8, 1953